United States Patent [19]

Bock et al.

[11] 4,333,026

[45] Jun. 1, 1982

[54] STEPPING MOTOR

[75] Inventors: Gustavus P. Bock, Bellbrook; Larry R. Miller, Springfield, both of Ohio

[73] Assignee: General Motors Corporation, Detroit, Mich.

[21] Appl. No.: 214,200

[22] Filed: Dec. 8, 1980

[51] Int. Cl.[3] .............................................. H02K 5/00
[52] U.S. Cl. .................................. 310/42; 310/49 R; 310/89; 310/257
[58] Field of Search ................... 310/42, 43, 112, 156, 310/257, 49, 89

[56] References Cited

U.S. PATENT DOCUMENTS

| | | | |
|---|---|---|---|
| 2,432,070 | 12/1947 | Sanborn | 310/163 |
| 2,441,079 | 5/1948 | Orzabal | 310/163 |
| 3,916,228 | 10/1975 | Knurr et al. | 310/42 |
| 4,107,559 | 8/1978 | Patel | 310/49 |
| 4,174,485 | 11/1979 | Soden et al. | 310/89 |

FOREIGN PATENT DOCUMENTS 184747 8/1963 Sweden.

Primary Examiner—Donovan F. Duggan
Attorney, Agent, or Firm—C. R. Meland

[57] ABSTRACT

An electric motor where the stator is positioned between motor end caps. The stator comprises a pair of housings that contain coil windings and one of the housings has a plurality of axially extending tabs bent over the other housing to secure the housings from axial separation. The bent over portion of a tab is compressed against a wall of an end cap when the stator is assembled between the end caps of the motor and is bendable to accommodate variations in axial dimensions of the motor. One of the motor housings has additional axially extending tabs that are received within openings formed in an end wall of the motor housing to prevent radial displacement of the stator relative to the motor housing.

6 Claims, 6 Drawing Figures

STEPPING MOTOR

This invention relates to small electric motors and more particularly to electric motors of the stepping or the synchronous type.

Stepping or synchronous motors of the type in which the stator is comprised of housing or casing members that have pole teeth are well known to those skilled in the art. In some motors of this type the housing members also serve as the outer casing or housing of the motor and serve to rotatably support the rotor of the motor. A motor of this general type is disclosed in the U.S. Pat. No. 2,432,070 to Sanborn.

In another form of stepping or synchronous motor the stator is contained within an outer housing that may also serve to rotatably support the rotor of the motor.

In the type of motor where the stator is located within an outer motor housing the stator must be secured to the motor housing so as to maintain a predetermined fixed relationship between it and the rotor of the motor. One arrangement for securing the stator to the motor housing is to press or axially clamp the stator between the motor housing end caps. If this method is utilized, the axial clamping force must be sufficient to prevent movement of the stator relative to the motor housing but cannot be so large as to unduly distort or crush the stator parts and this must be accomplished in spite of dimensional variations that may exist in the axial stack-up of parts.

It accordingly is an object of this invention to provide an improved mounting arrangement for a motor stator where the stator is clamped between motor end caps and wherein the stator is properly supported without subjecting it to an unduly high axial clamping force and further wherein the stator is arranged to accommodate variations in axial dimensions. This is accomplished by providing a stator that is comprised of a pair of stator housings. One housing has a plurality of tabs that are bent over the other housing to secure the housings from axial separation. The bent over tabs, in addition to providing the housing securing function, form compressible resilient dimensional take-up means that are compressed against one end cap of the motor when the stator is axially clamped between the motor end caps and the stator has additional tabs that are located within recesses formed in an end cap to thereby fix the stator from radial movement relative to the motor housing. More specifically, a pair of stator housings having inner pole teeth are provided that house a plurality of coil windings and pole plates and one of the housings has a plurality of axially extending tabs. The end portions of these tabs are bent over the other housing to thereby secure the housing members from axial separation. These bent over end portions are slightly spaced from the end wall of the other housing to thereby form axially compressible resilient tab portions that are adapted to engage an inner end wall means of the motor housing. The tabs, during assembly of the stator to the motor housing, can bend slightly to accommodate any axial dimensional variation in the axial stack-up of parts. Further, one of the stator housing members is provided with integral axially extending struck-out tabs that are received in recesses formed in the end wall of a motor end cap to prevent radial movement of the stator assembly with respect to the motor housing.

Still another object of this invention is to provide a motor end cap-stator unit in which the stator, during assembly to the motor, is fitted to the interior of a motor housing part and wherein the length of the unit is such that after assembly the end cap of the unit is positioned to form a closure for an open end of the motor housing. The stator is axially clamped between an end wall of the motor housing part and the end cap through resilient means carried by the unit. In carrying this object forward, the stator is comprised of two housings, the first of which is secured to the end cap and the other of which is secured to the first housing by tabs that extend axially of the first housing. The tabs are bent over the other housing to form resilient, compressible portions that are compressed to take-up dimensional variations when the end cap-stator unit is assembled and secured to the motor housing. The end cap may have an electrical connector portion for the motor and with this arrangement the end cap is formed of insulating material. Further, where the end cap is formed of insulating material, the first housing is secured to the end cap by staking or heading over integral projecting portions of the insulating material into engagement with the first housing.

IN THE DRAWINGS

The stepping motor of this invention will now be described. It is disclosed in conjunction with one of its uses, that is, as a valve operator. Thus, as will be more fully described hereinafter the rotor of the stepping motor has a threaded connection with a shaft which is axially translated during rotation of the rotor of the stepping motor. The shaft carries a valve plunger which is adapted to control flow through a valve seat. It is to be understood, however, that the stepping motor of this invention can be used to operate any other device and that the disclosure of its use as a valve translator should not be construed as a limitation of its use.

The stepping motor of this invention is a twelve pole stepping motor in which the stator assembly is comprised of two coil windings each of which is in a magnetic circuit with annular arrays of pole teeth. The rotor of the motor comprises a permanent magnet which is rotated when the coil windings are energized.

Figure 1:
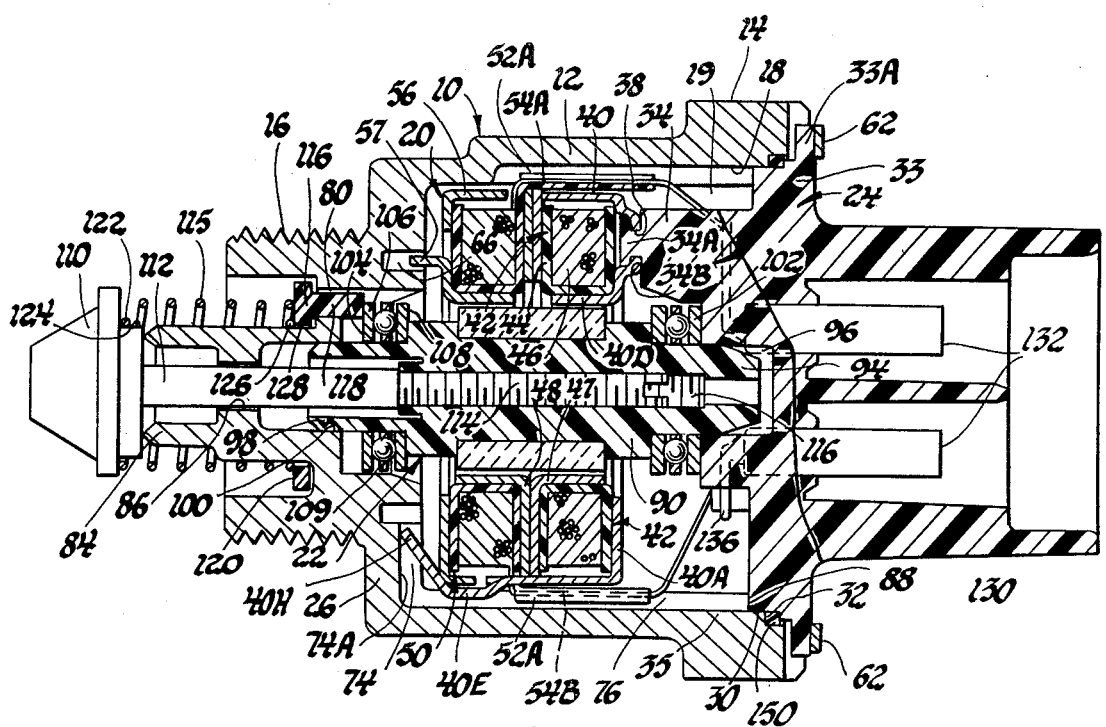
FIG. 1 is a sectional view, with parts broken away, of an electric stepping motor made in accordance with this invention.
Figure 2:
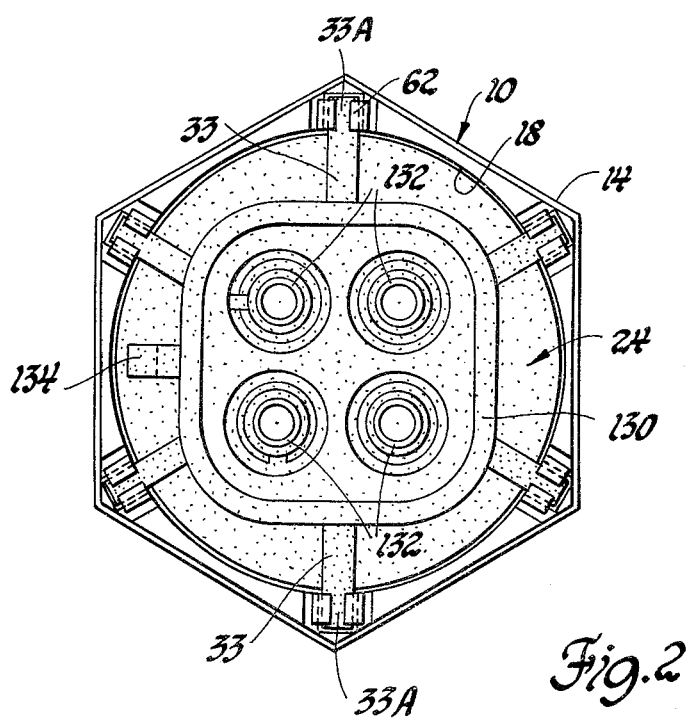
FIG. 2 is an end view of the motor illustrated in FIG. 1.
Figure 3:
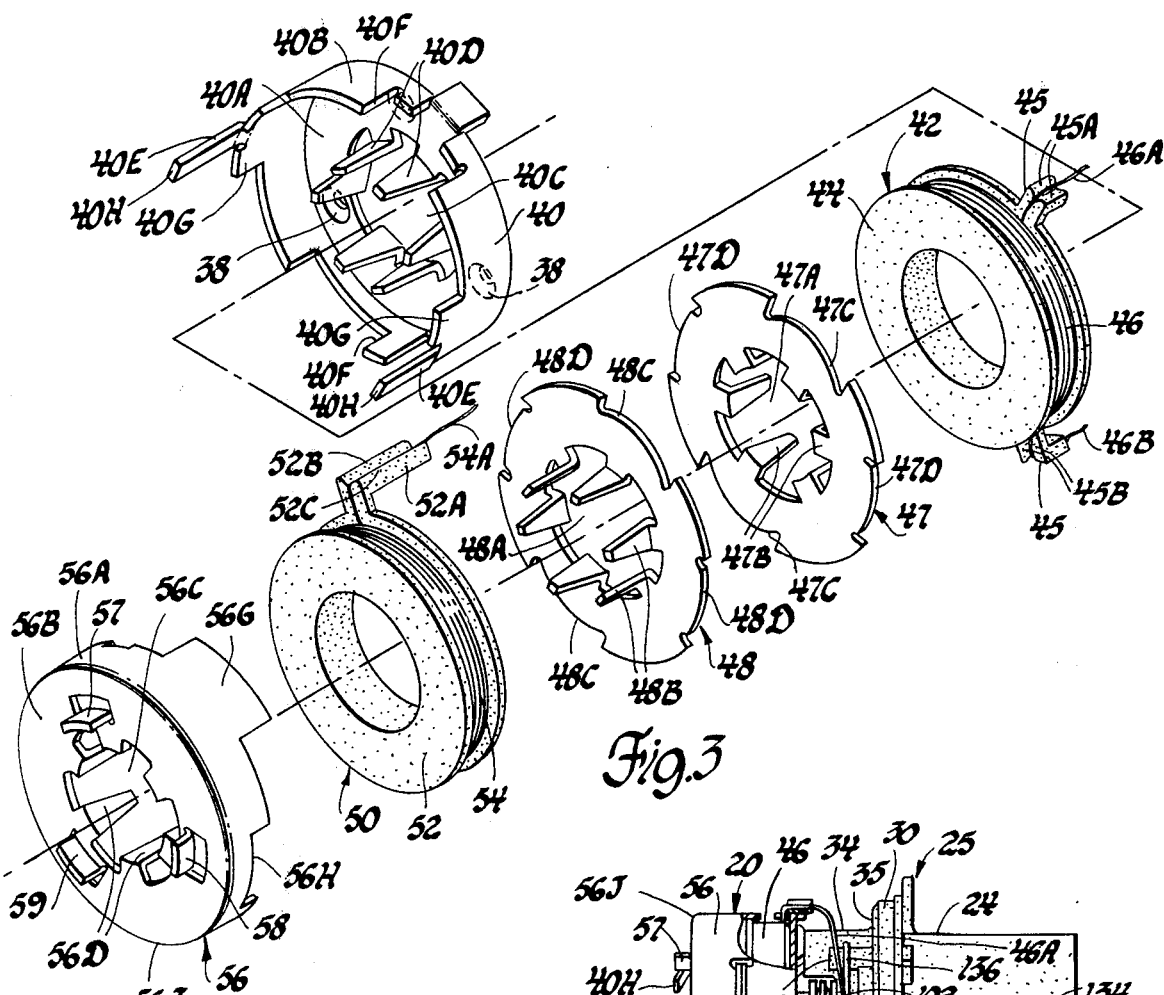
FIG. 3 is an exploded perspective view of the parts that make up the stator assembly for the motor of FIG. 1.

Referring now to the drawings, and more particularly to FIGS. 1 and 3, the electric motor of this invention comprises a metallic housing 10 formed, for example, of a die cast zinc material. The housing 10 has an annular wall 12 and a hexagonal head portion 14. The housing 10 is provided with a threaded section 16 which is adapted to be threaded into a complementary threaded opening in some device that contains a valve seat, where the motor is used as a valve translator.

The housing 10 has an inner annular wall 18 defining a chamber 19 that contains the stator assembly 20 and the rotor 22 of the stepping motor. The open end of the housing 10 is closed by an end cap 24 which is formed of electric insulating material. The stator assembly 20 is clamped, in a manner to be more fully described hereinafter, between the end cap 24 and an end wall 26 of the housing 10.

During assembly of the motor the stator assembly 20 is inserted into the chamber 19 and the end cap 24 is secured to the open end of housing 10. The stator 20 and end cap 24 are secured together prior to assembly to the housing 10 to provide a stator-end cap unit 25 depicted in FIG. 4.

The end cap 24 has an annular portion 30 located adjacent an annular radially extending wall 32 and has a plurality of radially extending ribs 33 that have end portions 33A. As will be more fully described, portions of the housing 10 are bent over end portions 33A to secure end cap 24 to housing 10. In addition, the end cap 24 has three axially extending posts or stator supporting portions 34. Each portion 34 has a small diameter cylindrical projection 34A which extends through a corresponding opening 38 formed in stator housing part 40 which is formed of magnetic material such as steel. The end of the portion 34A is headed or staked over by, for example, a hot staking operation to fasten the stator housing part 40 to the end cap 24. When this is accomplished, portions of the housing 40, bounding openings 38 tightly, engage walls 34B that respectively bound cylindrical projections 34A. The end cap 24 further has an annular end wall portion 35 that engages portions of the housing 10 when the end cap is assembled to the housing in a manner to be more fully described hereinafter.

The stator housing 40 is one component part of the stator assembly 20 and is depicted in FIGS. 1 and 3. The housing or cover 40 has an end wall 40A, an annular wall 40B, a central opening 40C and six pole teeth 40D which extend axially of end wall 40A. Extending axially of the annular wall 40B are two tabs 40E, the purpose of which is more fully described hereinafter.

The stator assembly 20 further includes a coil winding assembly generally designated by reference numeral 42. This coil winding assembly comprises a bobbin 44 formed of electrical insulating material upon which is wound the coil winding 46. The coil winding is wrapped at its outer periphery with, for example, two turns of electrical insulating tape which is not illustrated. The bobbin 44 is provided with two integral axially extending coil winding end turn wire supports 45. Each end turn wire support comprises a pair of ears 45A and 45B which provide a channel for receiving the ends 46A and 46B of the coil winding 46. The ears 45A and 45B are hot staked together to enclose, respectively, portions of the ends 46A and 46B of coil winding 46. It can be seen, from FIG. 1, that one end of the bobbin 44 engages the end wall 40A of the stator part 40 and that the coil winding 46 is disposed about the pole teeth 40D.

The stator assembly further includes pole plates or laminas generally designated, respectively, by reference numerals 47 and 48. These pole plates, like the stator housing 40, are formed of a magnetic material such as steel. The pole plate 47 has a central opening 47A and has six axially extending pole teeth 47B. In a similar fashion, the pole plate 48 has a central opening 48A and has six axially extending pole teeth 48B. In the final assembly of the motor, as shown in FIG. 1, the pole pieces engage each other in back-to-back relationship and the pole teeth 47B are interleaved with the pole teeth 40D of the stator housing 40 with all of these pole teeth being located within coil winding 46.

The stator 20 further includes another coil winding assembly generally designated by reference numeral 50 which comprises a bobbin 52 formed of insulating material and the coil winding 54 wound thereon. The coil winding 54 is taped at its outer periphery by two turns of tape which have not been illustrated. The bobbin 52 has two integral axially extending wire supporting portions 52A each of which is comprised of ears 52B and 52C which define a channel for respectively receiving the ends 54A and 54B of coil winding 54. The ears are hot staked together to enclose the portions of the ends of the coil winding 54 positioned in respective channels.

The final part of the stator 20 is the stator housing or cover generally designated by reference numeral 56 which is formed of magnetic material such as steel. This stator housing part has an annular wall 56A, an end wall 56B, a central opening 56C and a plurality of axially extending pole teeth 56D which again are six in number. In addition, the housing 56 has three integral struck out tab portions 57, 58 and 59 which are illustrated in FIGS. 1 and 4 and which extend axially of housing 56.

Figure 4:
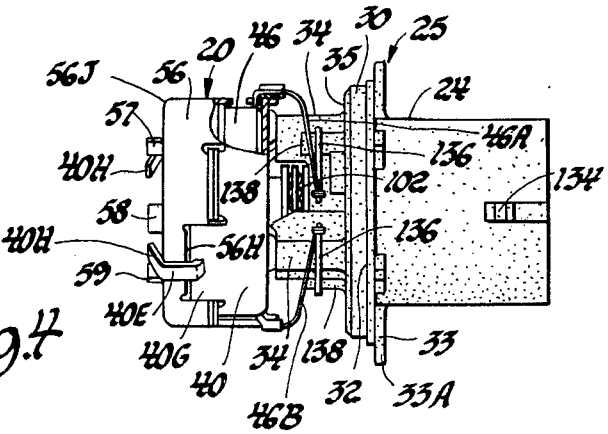
FIG. 4 is a side view with parts broken away of a stator-end cap unit which forms a part of the motor shown in FIG. 1.

In assembling the stator-end cap unit, shown in FIG. 4, the stator housing 40 is secured to the end cap 24 by staking over the portions 34A that extend through the openings 38 of the housing 40. The coil winding assembly 42, the pole plates 47 and 48, the coil winding assembly 50 and the housing 56 are then axially assembled together. During this assembly two circumferentially spaced axially extending portions 56G of the housing 56 fit within corresponding recesses 40F formed in the housing 40. Further, axially extending portions 40G of housing 40 fit within corresponding recesses 56H formed in the stator housing 56.

In addition, the two axially extending portions 56G of housing 56 extend, respectively, through the aligned recesses 47C and 48C of the pole plates 47 and 48 whereas axially extending portions 40G of housing 40 extend, respectively, through aligned recesses 47D and 48D of the pole plates 47 and 48 to thereby properly position all of the pole teeth of parts 40, 47, 48 and 56 with respect to each other and to prevent rotation of these parts with respect to each other.

With the parts axially assembled, as has been described, the end portions 40H of the axially extending tabs 40E are bent over the annular rim portion 56J of housing 56 so that they partially extend over the end wall 56B. By bending over the portions 40H the housing parts 40 and 56 are secured together and axially clamp the other parts of the stator assembly between walls 40A and 56B. This is illustrated in FIG. 4 in which the portions 40H are shown bent over to secure housing parts 40 and 56 from relative axial movement. It is pointed out that the portions 40H are slightly spaced from the wall 56B so as to form bendable, resilient ears that take up variations in axial dimensions of the motor in a manner to be more fully described. That is, the resilient tab portions 40H can be bent toward the end wall 56B of the housing 56 when the unit of FIG. 4 is assembled to the housing 10, all of which is more fully described hereinafter.

Figure 6:
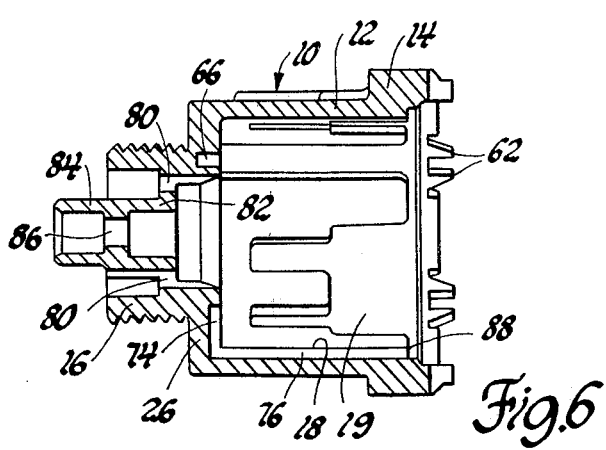
FIG. 6 is a sectional view taken along line 6—6 of FIG. 5.
Figure 5:
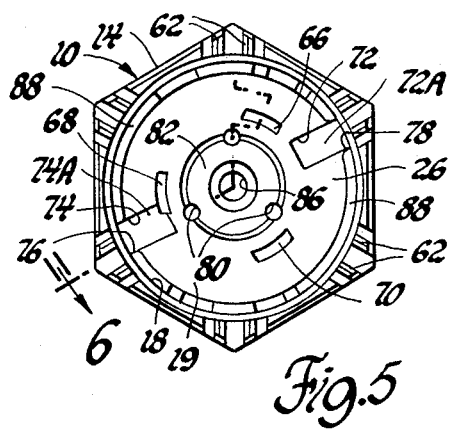
FIG. 5 is an end view of the housing of the motor shown in FIG. 1.

The housing 10, as illustrated in FIGS. 1, 5 and 6, has a plurality of axially extending lugs or tabs 62 which are bent over radially extending rib portions 33A of the end cap 24. The housing 10 has three arcuately extending recesses 66, 68 and 70 which, as will be more fully described, respectively receive the axially extending tabs 57, 58 and 59 of the housing part 56. In addition, the wall 26 of the housing 10 is provided with recesses 72 and 74 which are not as deep as the recesses 66, 68 and 70. The recess 74 communicates with an axially extending recess 76 and the recess 72 communicates with an axially extending recess 78. The housing 10 further includes three circular openings 80 which extend through a wall portion 82. A tubular extension 84 is provided having an opening 86 which serves as a guide for a valve shaft which is operated by the stepping motor. In addition, the housing 10 has a plurality of arcuately extending ledge portions 88 which are shown in FIG. 6. These ledge portions directly engage the annular wall portion 35 of the end cap 24 when the end cap-stator unit 25, of FIG. 4, is assembled to the housing 10. During this assembly the annular wall 35 bottoms out on the ledge portions 88.

The stepping motor further includes the rotor 22 which is comprised of a tubular part 90 formed of plastic material. Molded to the part 90 is an annular permanent magnet 92 which may be formed, for example, from a barium ferrite material. Although not illustrated on the drawing the outer periphery of the permanent magnet 92 is magnetized in an axial direction with circumferentially spaced alternate north and south poles in a manner well known to those skilled in the art. For a twelve pole motor there are twelve magnetized areas. The rotor 20 is rotatably supported at its right end by insertion of the portion 94 into the chamber 96 of the end cap 24. At its left end the rotor portion 98 is rotatably supported within the annular wall 100 of the housing 10. Thrust bearings 102 and 104 are provided with the thrust bearing 102 being disposed between a portion of rotor part 90 and a portion of end cap 24. The thrust bearings are identical and the thrust bearing 104 comprises washers 106 and 108 and a ball bearing assembly 109 interposed therebetween.

In the particular application of the stepping motor, shown in FIG. 1, the stepping motor axially moves a valve plunger 110 which is connected to a valve shaft 112. The valve shaft has a threaded portion 114 which engages a complementary threaded portion 116 formed in the internal bore of rotor part 90.

The valve plunger 110 is urged away from housing 10 by a compression spring 115. The spring is interposed between valve plunger 110 and a spacer ring 116 which has three legs 118 that extend through the openings 80 in housing 10. The leg portions 118 engage the thrust washer 104 whereas the wall portion 120 of the insert 116 engages one end of the spring 115. The left end of the spring 115, as viewed in FIG. 1, has a squared or straight portion 122 which engages a complementary flat section 124 formed on the valve plunger 110. In a similar fashion the right end of the spring has a straight or squared portion 126 which engages a complementary flat portion 128 of the valve housing. With this arrangement the spring is nonrotatably connected, respectively, to the valve plunger 110 and to the motor housing 10 and the torsional force of the spring prevents the valve plunger 110 and the shaft 112 from rotating relative to housing 10 when rotor 22 rotates. This, of course, causes the shaft 112 and the valve plunger 110 to be axially translated but not rotated when rotor 22 rotates. It will be appreciated that other means might be provided for preventing rotation of the valve shaft 112, for example the shaft 112 could be made noncircular to mate with a complementary noncircular opening 86.

The end cap 24 has an axially extending electrical connector portion 130 which supports a plurality of tubular metallic female electrical terminals 132. The terminals 132 form female terminals for an electrical connector that is adapted to be secured to the terminal portion 130 of the end cap 24.

The terminal portion 130 of the end cap 24 also has a locking tab 134 which is adapted to be snap-fitted to an electrical connector in the manner well known to those skilled in the art. The inner ends of tubular female terminals 132 are each electrically connected to relatively rigid wire conductors 136. The conductors 136, initially extend radially of portion 130 and after being connected to the ends of coil windings 46 and 54 are wrapped around posts 138 which are integral with the end cap 24.

In order to make an electrical connection between the coil windings and the terminals 132 the respective ends of coil windings 46 and 54 are electrically connected to respective conductors 136. Thus, the coil ends 46A and 46B of coil winding 46 are connected respectively to a pair of conductors 136, as shown in FIG. 4, and coil ends of coil winding 54 are electrically connected to another pair of conductors 136. These connections are made when the conductors 136 extend radially of portion 130 and, as mentioned, the conductors 136 are subsequently wrapped around posts 138 after the connections have been made as illustrated in FIG. 4. Each coil winding is connected respectively to two female terminals 132 for external connection to a motor drive system.

The assembly of the motor will now be described with particular emphasis on the arrangement for supporting the stator assembly 20 within the housing 10. It is assumed that a stator-end cap unit 25 has been constructed, as shown in FIG. 4, and at this point in the assembly the thrust bearing 102 has been assembled to the end cap 24 and is supported within the axially extending posts 34. The rotor 22, with the shaft 112 threaded thereto, can now be assembled to the end cap 24. This can be accomplished by inserting the portion 94 of the rotor through the stator 20 and through the thrust bearing 102 into the chamber 96. Thrust bearing 104 can now be assembled over portion 98 of the rotor 22. The assembly, which is now comprised of unit 25 which carries the thrust bearings and rotor, is now ready for assembly to the housing 10. During this assembly the unit 25 and housing 10 are brought together with the shaft 112 extending through opening 86. While these parts are being brought together the tabs 57, 58 and 59 fit, respectively, within the recesses 66, 68 and 70. Further, the axially extending tabs 40E are positioned within recesses 74 and 78 and eventually the bent over portions 40H, respectively, engage the end walls 74A and 72A of the recesses 74 and 72. A quantity of a suitable curable sealant material 150, such as silicone rubber, is interposed between the end cap 24 and the end of the housing 10. The end cap 24 and the housing 10 are now moved together until the annular wall 35 of the end cap bottoms out on the ledges 88 of the housing 10. The parts are held in this position whereupon the lugs or ribs 62 are bent over the ribs 33A of the end cap 24. This securely fastens the end cap 24 to the housing 10.

During the time that the ears 62 are headed over portions 33A of end cap 24 the resilient tabs or ears 40H engage the surfaces 72A and 74A. These ears can bend to take up any dimensional variations in the axial stack-up of parts. Further, these ears, after final assembly, apply a compressive force to the stator assembly so that in effect it is compressed between the ears and the walls 34B of the end cap 24 disposed about the openings 38 in housing 40.

It will be appreciated that the axially extending tabs 57, 58 and 59 prevent cocking or radial displacement of the stator assembly since they are disposed within the recesses 68, 70 and 72. This arrangement further prevents cocking of the stator assembly during the time that the ears 40H are being compressed since the tabs being positioned in the recesses will not permit such cocking action.

When the unit 25 has been assembled to the housing 10, as described, the valve plunger 110, spring 115 and spacer ring 116 can then be assembled. The valve plunger 110 has an internal threaded portion (not illustrated) which can be threaded to a complementary portion (not illustrated) on the end of shaft 112. Thus, after the spacer and spring have been assembled the valve plunger 110 can be assembled to the end of shaft 112.

As previously mentioned, the motor of this invention has been described for use in translating a valve. Obviously the motor can be used for other applications. Thus, were it desired that the motor rotatably drive some device the rotor could be arranged such that it has no internal bore and arranged such that a solid shaft portion, corresponding to portion 98, would extend through an end wall of the housing 10 and be coupled to the device to be driven.

The embodiments of the invention in which an exclusive property or privilege is claimed are defined as follows:

1. A stator for an electric motor that is assembled to the interior of a motor housing means having an end wall and an open end that is closed by an end cap and wherein after assembly the stator is axially clamped between the end wall of the motor housing and the end cap comprising, housing means comprised of first and second housing members that contain at least one coil winding, each housing member having a plurality of circumferentially spaced poles that define a bore that is adapted to receive the rotor of the motor, a plurality of first tabs integral with said second housing member extending axially of said housing members and each having an end portion partially bent over an end wall of said first housing member to secure said housing members from axial separation, at least a portion of each tab end portion being spaced from the end wall of said first housing member to thereby form bendable resilient means adapted to engage the end wall of the motor housing when said stator assembly is clamped between said end wall of said motor housing and said end cap, and a plurality of second tabs extending axially of said first housing member adapted to be received in corresponding recesses formed in said end wall of said motor housing to fix the stator from radial movement relative to the motor housing.

2. A stator for a stepping motor comprising, first and second generally cup-shaped housings, each housing having a plurality of inner poles extending axially of the end walls of said housing that are adapted to be disposed about a rotor of the stepping motor, one of said housings having a recess that receives a complementary projection on the other housing to thereby prevent relative rotation between said housings, at least one annular field coil located within said housings, a plurality of tangs integral with said second housing extending axially of said housings having end portions that are partially bent over the end wall of said first housing to secure said housings from axial separation, at least a portion of the end portions of said tangs being spaced from the end wall of said first housing whereby the end portions form resilient bendable means adapted to contact the end wall of a motor housing when said stator assembly is inserted axially into a motor housing.

3. A housing and stator assembly for an electric motor comprising, motor housing means having an end wall, an end cap secured to said housing means, a stator axially clamped between said end cap and said end wall, said stator comprising a first housing member engaging said end cap and a second housing member located adjacent said end wall, said housing members having pole teeth and containing at least one coil winding, a plurality of first tabs secured to said first housing member having portions bent over said second housing member, said portions being spaced from an outer end of said second housing member to thereby form resilient bendable portions engaging said end wall of said motor housing means, and a plurality of second axially extending tabs integral with said second housing member disposed within recesses formed in said end wall to prevent radial movement of the end of said stator that is located adjacent said end wall.

4. An electric motor comprising, a generally cup-shaped motor housing having an end wall located at one end thereof, an end cap located at the opposite end of the motor housing and secured thereto, a stator comprising first and second housing members having pole teeth and containing at least one coil winding, means securing said first housing member to said end cap, said first housing member having a plurality of first integral axially extending tabs, portions of which are bent over said second housing member to secure said housing members from axial separation, said bent over portions spaced from an outer wall of said second housing member to thereby form resilient bendable means engaging said end wall of said motor housing, a plurality of circumferentially spaced recesses formed in said end wall, a plurality of second tabs extending axially from said second housing member disposed within said recesses for preventing radial movement of said stator assembly relative to said end wall, and a rotor disposed within said stator assembly.

5. An end cap-stator unit for an electric motor comprising, a motor end cap, a first stator housing secured to said end cap, a second stator housing, said first and second stator housings having inner pole teeth and containing at least one coil winding, a plurality of first tabs secured to said first housing each having an end portion bent over said second housing for securing said first and second housings from axial separation, said bent over portions being spaced from said second housing to thereby form resilient means that is adapted to engage an inner end wall of a motor housing when said stator assembly is assembled to the interior of a motor housing, and a plurality of second tabs extending axially from said second housing adapted to be received in corresponding recesses formed in said inner end wall of the motor housing.

6. An electric stepping motor comprising, a generally cup-shaped motor housing having an open end, and end cap secured to said cup-shaped housing and closing said open end, said end cap formed of insulating material and having a plurality of axially extending projections, a first stator housing having a plurality of openings receiving said end cap projections, said projections being headed over against said first stator housing to secure said first stator housing to said end cap, a second stator housing, said first and second stator housings having inner axially extending pole teeth and containing at least one coil winding, a plurality of first tabs integral with said first housing member extending axially thereof each having a portion bent over said second housing member to secure said housing members from axial separation, said bent over portions engaging an inner end wall of said cup-shaped housing, and a plurality of second axially extending tabs integral with said second housing member disposed within corresponding recesses formed in said end wall of said motor housing to prevent radial movement of one of said stator housings, and a rotor disposed within said pole teeth of said stator housings rotatably supported by said cup-shaped housing and end cap.

* * * * *